United States Patent Office.

HENRY BECHTOLD AND JOHN NUNAMACHER, OF LANCASTER COUNTY, PENNSYLVANIA.

Letters Patent No. 81,975, dated September 8, 1868.

IMPROVED YELLOW-WASH FOR BARNS, BUILDINGS, &c.

*The Schedule referred to in these Letters Patent and making part of the same.*

TO ALL WHOM IT MAY CONCERN:

Be it known that we, HENRY BECHTOLD and JOHN NUNAMACHER, of the county of Lancaster, and State of Pennsylvania, have, after a series of experiments, invented or discovered a new Combination or Compound for a Permanent Yellow-Wash or Paint to Cover Barns and Buildings; and we do hereby declare that the following is a full and exact description of the ingredients, and mode of combining them, for being put upon boards, by means of a wall-brush or its equivalent.

The nature of our compound is, in providing a cheap and durable wash or paint, that improves by exposure, and has stood the test of the heaviest showers of rain, and even when the spout was suffered to play upon one point during a heavy shower, no sign of eradicating the wash appeared.

To enable any one to make and use our compound, it is only necessary to say that, for an ordinary-sized barn and corn-crib, or wagon-shed attached, the following ingredients and quantity named will suffice to give a good coating of the combined wash, viz:

Take twenty pounds of copperas, fifteen pounds of yellow ochre, five pounds of chrome-yellow, one pound of alum, one pound of glue, and one peck of common salt.

Dissolve the copperas, alum, and salt in boiling water. It will require about ten gallons of water. Boil the glue in the ordinary way till thoroughly dissolved. Mix the yellow ochre and chrome-yellow, and stir them well into the hot solutions previously combined. When well mixed, add one peck of lime, previously slaked to the consistency of whitewash. This is also mixed while hot and the glue-water added, and then the whole thoroughly incorporated. If too thick to spread freely, a little water may be added.

We have tested the above wash on several barns, and find that the air and light produce a chemical change that gives it a lively and glossy color, and in appearance and quality as if painted with the ordinary oil-paint and varnish. Thus it is as desirable for its beauty and permanence as for its cheapness and the simple mode of its application, like common whitewash.

We are aware that copperas, salt, glue, and ochre, or chromic yellow, have been used in various combinations, and therefore do not claim any of the ingredients separately considered; but we are not aware that the proportions and all the named articles were ever before used, combined in the manner set forth.

What we claim as our invention or discovery, is—

The composition of a yellow-wash or paint, combined substantially in the manner and for the purpose specified.

HENRY BECHTOLD,
JOHN NUNAMACHER.

Witnesses:
WM. R. WILEY,
JACOB STAUFFER.